Feb. 26, 1935.   D. M. BARDON   1,992,165
ROD HOLDER
Filed April 11, 1934
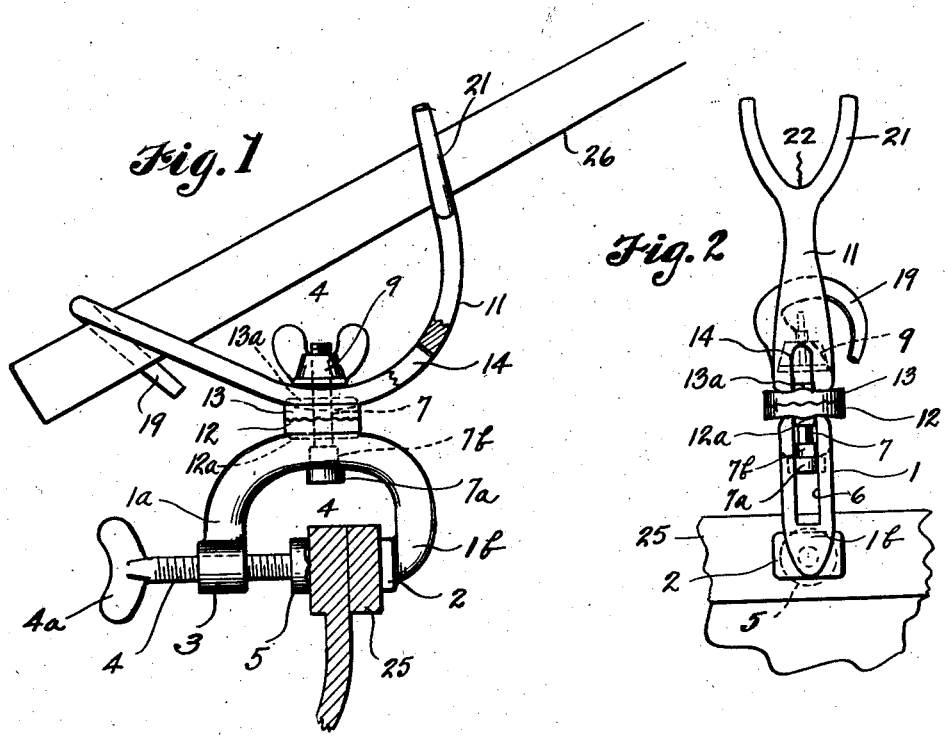
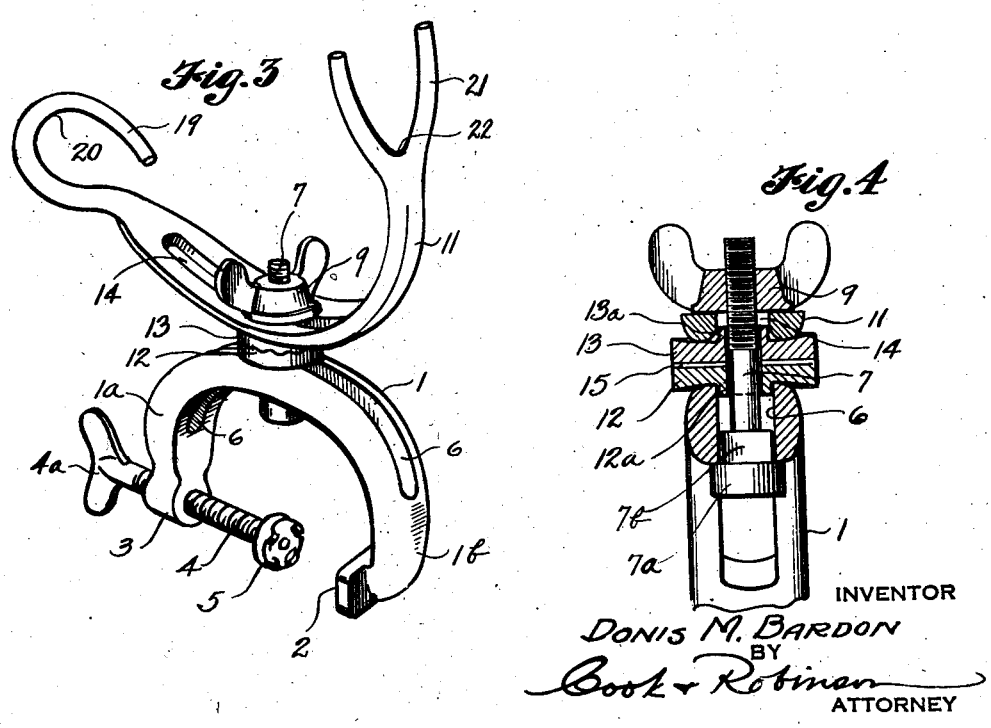
INVENTOR
DONIS M. BARDON
BY
Cook + Robinson
ATTORNEY Patented Feb. 26, 1935

1,992,165

UNITED STATES PATENT OFFICE 1,992,165

ROD HOLDER

Denis M. Bardon, Seattle, Wash.

Application April 11, 1934, Serial No. 720,036

2 Claims. (Cl. 248—37)

This invention relates to improvements in rod supporting devices and more particularly to means whereby a fishing rod, or the like, may be supported from the gunwale of a boat or other form of support to which it is applicable.

The principal object of this invention is to provide a rod supporting means embodying a clamp adapted to be attached to a gunwale, rail or other supporting member and on which clamp a rod holding bracket is adjustably mounted so that a rod applied to the bracket may be held in different positions.

A further object of the invention is to provide a device of the above stated character that is suitable either for still fishing or for trolling purposes and which may be easily and readily adjusted to different positions and secured there.

Other objects of the invention reside in the details of construction of the parts of the device, in their combination and mode of operation, as will hereinafter be fully described.

In accomplishing these, and other objects of the invention, I have provided the improved details of construction, the preferred forms of which are illustrated in the accompanying drawing, wherein—

Fig. 1 is a rod holding device embodied by the present invention, illustrating the device as applied to a boat and with a rod supported therein.

Fig. 2 is an end view of the device.

Fig. 3 is a perspective view of the same.

Fig. 4 is a cross section, as seen on the line 4—4 in Fig. 1.

Referring more in detail to the drawing—

In its preferred form of construction the device embodied by this invention comprises a base, or clamping member, that is adapted to be removably attached to a suitable supporting means, and a rod holding bracket that is adjustably mounted on the clamping member for universal adjustment of a rod disposed therein. The clamp comprises a yoke like member 1 provided with oppositely disposed and spaced apart leg portions 1a and 1b for disposition on opposite sides of a support; the leg 1b being provided at the end with an inwardly facing abutment 2 for engaging one side of the support while the opposite leg has a bearing portion 3 through which a clamping screw 4 is threaded. The screw is provided at its outer end with a thumb piece 4a, and at its inner end has a swiveled clamping head 5 adapted to engage the support in opposed relation to the abutment 2.

The clamping member is substantially semicircular in form and is provided throughout its length and in the plane of the clamping screw 4, with a slot 6 through which a bolt 7 is extended for attaching the rod mounting bracket on the clamp member. The inner end of the bolt is provided with an enlarged head 7a engaging with the inner side of the clamp member along opposite sides of the slot and this head has a flattened neck portion 7b contained within the slot 6 to prevent the bolt from rotating therein.

Mounted on the outer threaded end of the bolt 7 by means of a wing nut 9 is the pole supporting bracket 11, and intermediate the bracket and the clamp member are two knurled washers 12 and 13 which loosely surround the bolt. The washer 12 has a flattened under surface resting against the upper surface of the clamp member and it has a flattened rib 12a diametrically thereof on its under side fitted within the slot 6 of the clamp member to prevent rotation of the washer. The upper washer 13 likewise has a flattened upper surface formed with a diametric rib 13a that is fitted within a longitudinal slot 14 in the rod supporting bracket. The adjacent surfaces of the two washers have interfitting corrugations 15, and when they are tightened together by the tightening of the wing nut 9 on the bolt they are locked against relative rotation. It is apparent that since the lower washer 12 is held against rotation on the clamp member by the rib 12a resting in slot 6, and since the bracket is held against rotation by reason of the rib 13a on washer 13, the bracket then will be held against relative rotation on the clamp.

The rod supporting bracket is arcuately curved to substantially semicircular form and is disposed opposite to the position of the clamp member. At one end the bracket has a laterally and downwardly turned hook forming portion 19 providing a downwardly facing seat 20. At the opposite end of the bracket is an upwardly facing forked portion 21, forming an upwardly facing seat 22.

In using the device, the clamp member 1 is first secured to a supporting member, indicated at 25, by tightening the head 5 of the screw against one side of the support while the abutment 2 is seated against the opposite side. The support may be the side rail of a boat or it may be a bar or other support. The rod supporting bracket is then adjusted to a desired position on the clamp by loosening the nut 9 on bolt 7 to permit shifting of the bolt along the slot 6 of the clamp member and the rotation and shifting of the bracket on the outer end of the bolt. When the desired adjustment of the bracket has been obtained the parts are locked in that adjusted position by tightening the wing nut 9 to clamp the parts on the bolt 7 tightly together. The end of the fishing rod, as designated at 26, is then placed in the bracket by resting it within the seats 20 and 22 of the hooked and forked ends. If it is desired to adjust the elevation of the rod this is done by loosening the wing nut so that the bracket may be adjusted along the bolt. If it is desired to adjust the pole angularly with respect to the clamp the bracket is simply rotated on the bolt, then the parts again locked by tightening the wing nut. The rod may be readily removed or applied without changing the adjustment of the parts.

Devices of this character are especially desirable for still fishing and for trolling, and they may be made in various sizes to suit the uses to which they are to be put. Change in form of the bracket and clamp may be made without departing from the spirit of the invention.

Having thus described my invention, what I claim as new therein and desire to secure by Letters Patent is—

1. A rod holder comprising an arcuate clamping member provided with a longitudinal slot and equipped with means whereby the member may be detachably secured to a support, an arcuate bracket disposed on the clamp member in opposite relation thereto and provided with a longitudinal slot, a bolt connecting the clamp member and bracket and extended through said slots thereof and provided at one end with a head for retaining it in place; said bolt being adjustable along the slot of the clamp member, and said bracket being pivotally movable about the bolt and longitudinally adjustable to different positions of inclination, a pair of washers disposed about the bolt between the clamp member and bracket; said washers, respectively, having parts thereof adapted to interlock with the clamp member and bracket to prevent relative turning, and having adjacent surfaces formed to interlock against rotation when tightened together, a nut threaded onto the outer end of the bolt adapted to be tightened thereon to clamp the parts on the bolt together to retain them in any adjusted position and means on the bracket for holding a rod.

2. A rod holder comprising an arcuate clamping member, formed with a slot longitudinally thereof, and provided at its ends with opposed means coacting to secure the member to a support, an arcuate bracket applied to the clamp member in opposite relation thereto; said bracket having a longitudinal slot and formed at its opposite ends, respectively, with an outwardly opening seat and an inwardly opening hook for mounting a rod, a bolt connecting the clamp member and bracket; said bolt having a head portion at its inner end for retaining it in place; said bolt being movable along the slot of the clamp member, and said bracket being pivotally movable about the bolt and longitudinally adjustable thereon, a pair of washers disposed about the bolt between the clamp member and bracket; said washers being provided on their outer sides with diametric ribs seated in the slots of the clamp member and bracket, respectively, and provided on their adjacent surfaces with corrugations adapted to interlock to prevent relative rotation of the washers, and a nut threaded onto the outer end of the bolt to clamp the parts together.

DONIS M. BARDON.